(12) United States Patent
Kim

(10) Patent No.: US 10,834,468 B2
(45) Date of Patent: Nov. 10, 2020

(54) METHOD, SYSTEM, AND NON-TRANSITORY COMPUTER READABLE MEDIUM FOR AUDIO FEEDBACK DURING LIVE BROADCAST

(71) Applicant: LINE Corporation, Tokyo (JP)

(72) Inventor: Keum Ryong Kim, Seongnam-si (KR)

(73) Assignee: LINE Corporation, Tokyo (JP)

(*) Notice: Subject to any disclaimer, the term of this patent is extended or adjusted under 35 U.S.C. 154(b) by 0 days.

(21) Appl. No.: 16/149,392

(22) Filed: Oct. 2, 2018

(65) Prior Publication Data

US 2019/0124399 A1 Apr. 25, 2019

(30) Foreign Application Priority Data

Oct. 25, 2017 (KR) .................. 10-2017-0139197

(51) Int. Cl.

| | |
|---|---|
| *H04N 7/173* | (2011.01) |
| *H04N 21/4788* | (2011.01) |
| *H04N 21/2743* | (2011.01) |
| *G06F 3/16* | (2006.01) |
| *H04N 7/14* | (2006.01) |
| *H04L 29/06* | (2006.01) |
| *H04N 21/439* | (2011.01) |
| *H04N 7/15* | (2006.01) |

(52) U.S. Cl.
CPC ........... *H04N 21/4788* (2013.01); *G06F 3/16* (2013.01); *H04L 65/403* (2013.01); *H04L 65/4015* (2013.01); *H04N 7/147* (2013.01); *H04N 7/152* (2013.01); *H04N 21/2743* (2013.01); *H04N 21/439* (2013.01)

(58) Field of Classification Search
CPC .................. H04N 21/2743; H04N 21/4788
See application file for complete search history.

(56) References Cited

U.S. PATENT DOCUMENTS

| | | | |
|---|---|---|---|
| 6,359,971 B1* | 3/2002 | Haimi-Cohen | H04M 1/271 379/88.01 |
| 2009/0070376 A1* | 3/2009 | Eom | G06F 17/211 |
| 2010/0077422 A1* | 3/2010 | Bushinsky | H04N 21/8583 725/13 |
| 2018/0067641 A1* | 3/2018 | Lerner | H04N 21/42203 |
| 2018/0234738 A1* | 8/2018 | Sarkar | H04N 21/2187 |
| 2019/0087151 A1* | 3/2019 | Systrom | G06F 3/167 |

FOREIGN PATENT DOCUMENTS

KR 102006012057 A 11/2006

* cited by examiner

*Primary Examiner* — Gigi L Dubasky
(74) *Attorney, Agent, or Firm* — Harness, Dickey & Pierce, P.L.C.

(57) ABSTRACT

Provided is a method, system, and non-transitory computer-readable recording medium for delivering audio feedback of a viewer to a caster during a live broadcast. A method implemented on a computer system includes providing a live broadcast by receiving broadcast content transmitted from an electronic device of a caster, and by streaming the received broadcast content to each of electronic devices of a plurality of users through a communication session established between an account of the caster and accounts of the plurality of users; receiving an audio feedback about the live broadcast from an electronic devices of a user during the live broadcast; and delivering the audio feedback to the electronic device of the caster.

18 Claims, 10 Drawing Sheets

METHOD, SYSTEM, AND NON-TRANSITORY COMPUTER READABLE MEDIUM FOR AUDIO FEEDBACK DURING LIVE BROADCAST

CROSS-REFERENCE TO RELATED APPLICATION

This U.S. non-provisional application claims the benefit of priority under 35 U.S.C. § 119 to Korean Patent Application No. 10-2017-0139197 filed on Oct. 25, 2017, in the Korean Intellectual Property Office (KIPO), the entire contents of which are incorporated herein by reference.

BACKGROUND

Field

One or more example embodiments relate to a technique for delivering a feedback of a viewer to a caster during a live broadcast.

Description of Related Art

Currently, media clients including a live broadcast are on the rapid growth.

A caster may upload a live broadcast in a channel corresponding to a media client of the caster and a viewer may readily view the live broadcast uploaded by the caster by way of a media client of the viewer.

For example, a live streaming broadcast method for a live broadcast over a network is disclosed in Korean Patent Laid-Open Publication No. 10-2006-0120571, published on Nov. 27, 2006.

SUMMARY

One or more example embodiments provide a technique that enables a viewer to directly deliver an audio feedback to a caster during a live broadcast.

One or more example embodiments also provide a technique that enables a caster to immediately listen to an audio feedback of a viewer without performing a separate operation during a live broadcast.

According to an aspect of at least one example embodiment, there is provided a method implemented on a computer system. The computer system includes one or more processors configured to execute non-transitory computer-readable instructions included in a memory, and the method includes providing, by the one or more processors, a live broadcast by receiving broadcast content transmitted from an electronic device of a caster and by streaming the received broadcast content to each of electronic devices of a plurality of users through a communication session established between an account of the caster and accounts of the plurality of users; receiving, by the one or more processors, an audio feedback about the live broadcast from an electronic device of a user during the live broadcast; and delivering the audio feedback to the electronic device of the caster.

The delivering may include activating an audio channel between the account of the caster and the account of the user in response to receiving an audio input signal from the electronic device of the user, receiving an audio message from the electronic device of the user in real time, and delivering the audio message to the electronic device of the caster.

The delivering may include activating an audio channel of a push-to-talk (PTT) scheme or a voice call scheme in response to an audio input signal from the electronic device of the user.

The delivering may include receiving an audio message in a recording file format from the electronic device of the user, and delivering the audio message to the electronic device of the caster.

The audio feedback may be output through an audio output interface of the electronic device of the caster immediately after the audio feedback is received.

The delivering may include determining whether to allow the audio feedback of the user based on broadcast environment settings of the caster.

The delivering may include determining whether to allow the audio feedback of the user based on a feedback history of the user.

The delivering may include determining whether to share the audio feedback with the plurality of users based on broadcast environment settings of the caster.

The providing may include providing a function of applying at least one of an effect and a filter to an image of the broadcast content.

The method may further include storing, by the one or more processors, the broadcast content and the audio feedback in a database system in association with a chatroom corresponding to the communication session.

According to an aspect of at least one example embodiment, there is provided a non-transitory computer-readable recording medium storing instructions that, when executed by a processor, cause the processor to perform the method.

According to an aspect of at least one example embodiment, there is provided a computer system including a memory configured to store non-transitory computer-readable instructions; and one or more processors configured to execute the non-transitory computer-readable instructions to provide a live broadcast by receiving broadcast content transmitted from an electronic device of a caster, and by streaming the received broadcast content to each of electronic devices of a plurality of users through a communication session established between an account of the caster and accounts of the plurality of users; receive an audio feedback about the live broadcast from an electronic device of a user during the live broadcast; and deliver the audio feedback to the electronic device of the caster.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
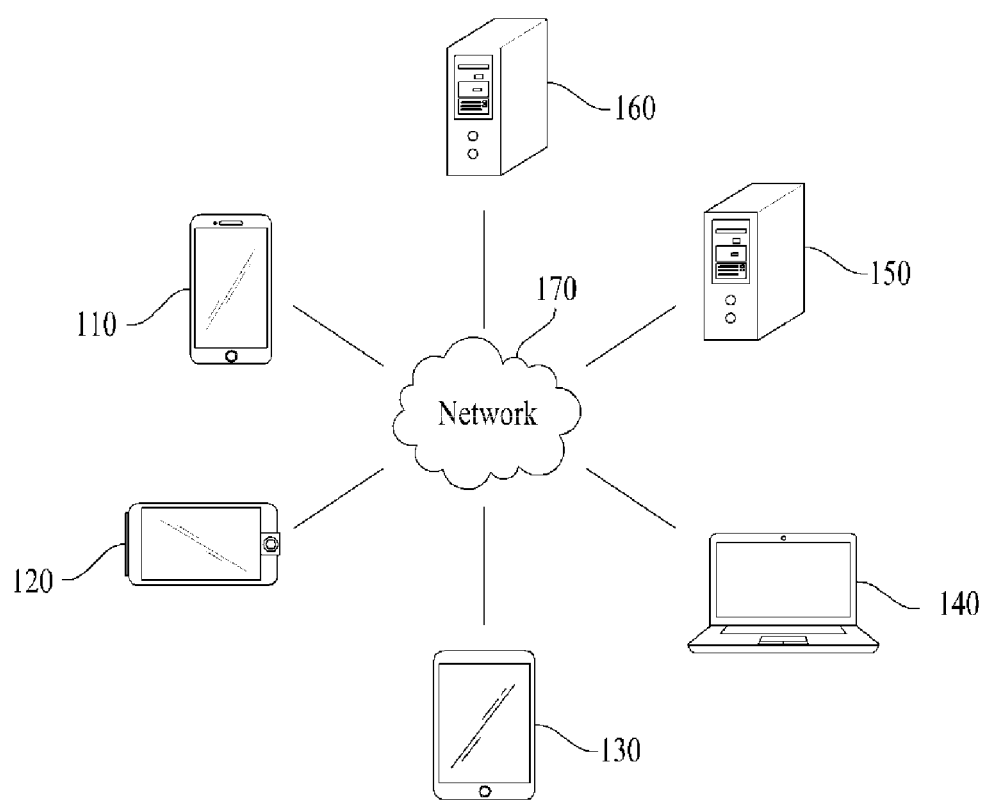
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Some example embodiments, however, may be embodied in various different forms, and should not be construed as being limited to only the illustrated embodiments. Rather, the illustrated embodiments are provided as examples so that this disclosure will be thorough and complete, and will fully convey the inventive concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A live broadcast providing method according to some example embodiments may be performed through a computer apparatus such as an electronic device or a server to be described below. Here, a computer program according to some example embodiments may be installed and executed on the computer apparatus and the computer apparatus may perform the live broadcast providing method according to some example embodiments under control of the executed computer program. The computer program may be stored in non-transitory computer-readable recording media to execute the live broadcast providing method on a computer in conjunction with the computer apparatus. For example, the server may provide a live broadcast streaming service based on a social network service (SNS), for example, a messenger, which enables a group conversation or a group call over the Internet. Here, the server may deliver a feedback of a viewer to a caster presenting a live broadcast in real time. Here, the terms "viewer" and "user" may be interchangeably used throughout.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and/or 140 may be a fixed terminal or a mobile terminal configured as a computer device. For example, the plurality of electronic devices 110, 120, 130, and/or 140 may be a smartphone, a mobile phone, a navigation, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates the electronic device 110 in a shape of a smartphone, it is provided as an example only. Here, the electronic device 110 may refer to any type of various physical computer devices capable of communicating with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide, as the first service, a service (e.g., a live broadcast streaming service) intended by a corresponding application through the application as the computer program that is installed and executed on the plurality of electronic devices 110, 120, 130, and/or 140. As another example, the server 160 may provide, as the second service, a service that distributes a file for installing and executing the application to the plurality of electronic devices 110, 120, 130, and/or 140.

Figure 2:
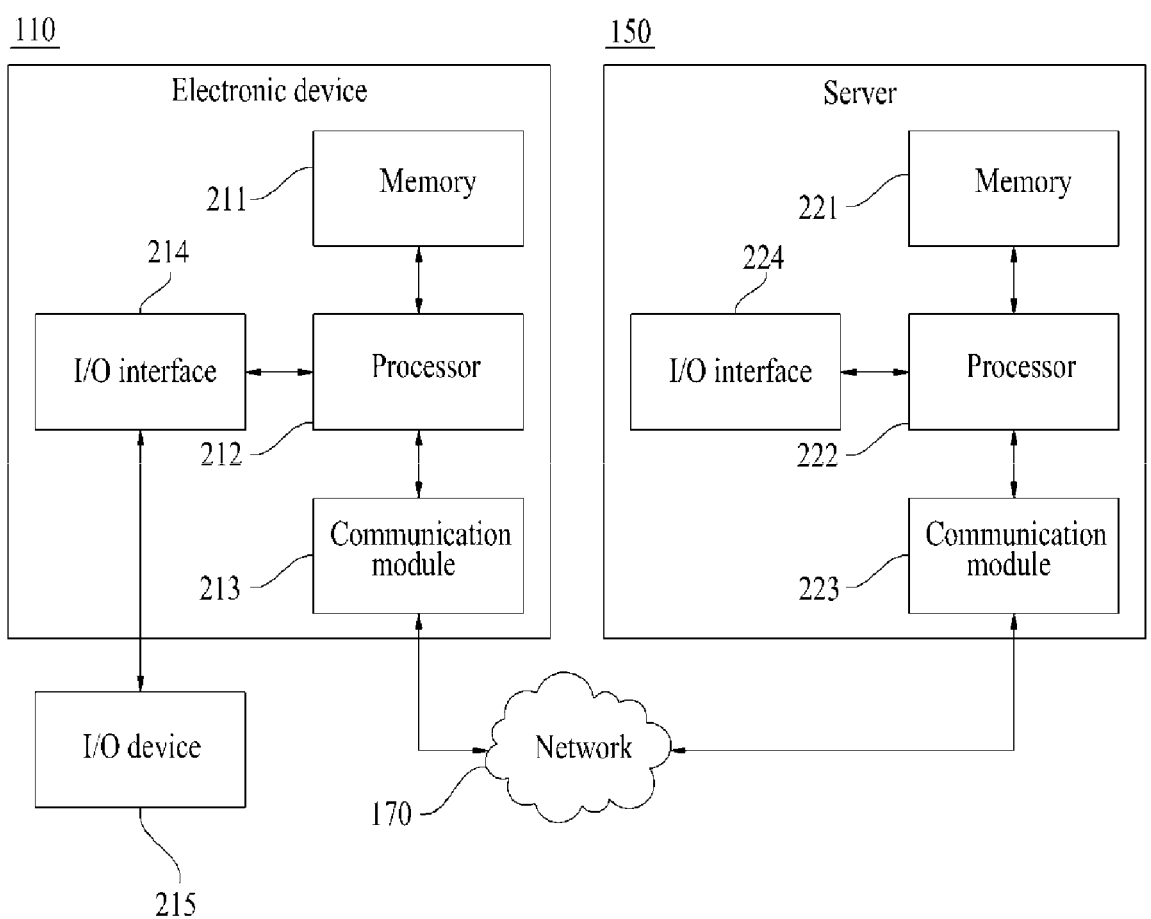
FIG. 2 is a block diagram illustrating a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, a solid state drive (SSD), a flash memory, etc., as a non-transitory computer-readable storage medium. Here, the permanent mass storage device, such as ROM, SSD, flash memory, disk drive, etc., may be included in the electronic device 110 or the server 150 as a permanent storage device separate from the memory 211, 221. Also, an OS or at least one program code, for example, a code for an application for providing a specific service installed on the electronic device 110 or a browser installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device used for connection with the server 150 or for interface with a device (not shown) for input or output includable in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to some other example embodiments, the electronic device 110 and the server 150 may include a greater or lesser number of components than a number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, example embodiments of a system and method for delivering a feedback of a viewer to a caster during a live broadcast will be described.

A live broadcast streaming service relates to providing a live broadcast through a group chatroom in which a plurality of users participate and may deliver a feedback of a viewer to a caster in such a manner that the viewer inputs a reaction button (like, angry, sad, etc.), emogi, and/or a sticker or creates a text-based message while viewing the broadcast through the chatroom through which the broadcast is being presented.

The feedback of the viewer on the live broadcast is generally provided in the form of text messages. Thus, if the viewer is in a situation difficult to send a text message, or if some viewers that are familiar with audio communication need to deliver feedback, such viewers may feel that providing feedback on the live broadcast in the form of text messages is difficult or inconvenient.

Accordingly, the live broadcast streaming service may provide a function that enables the viewer to deliver an audio feedback to the caster in real time. Through this, the caster may verify the audio feedback of the viewer even in an environment in which it is difficult to verify feedback in the form of a text message, for example.

Figure 3:
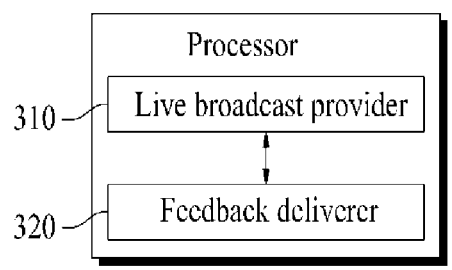
FIG. 3 is a block diagram illustrating an example of a component includable in a processor of a server according to at least one example embodiment.
Figure 4:
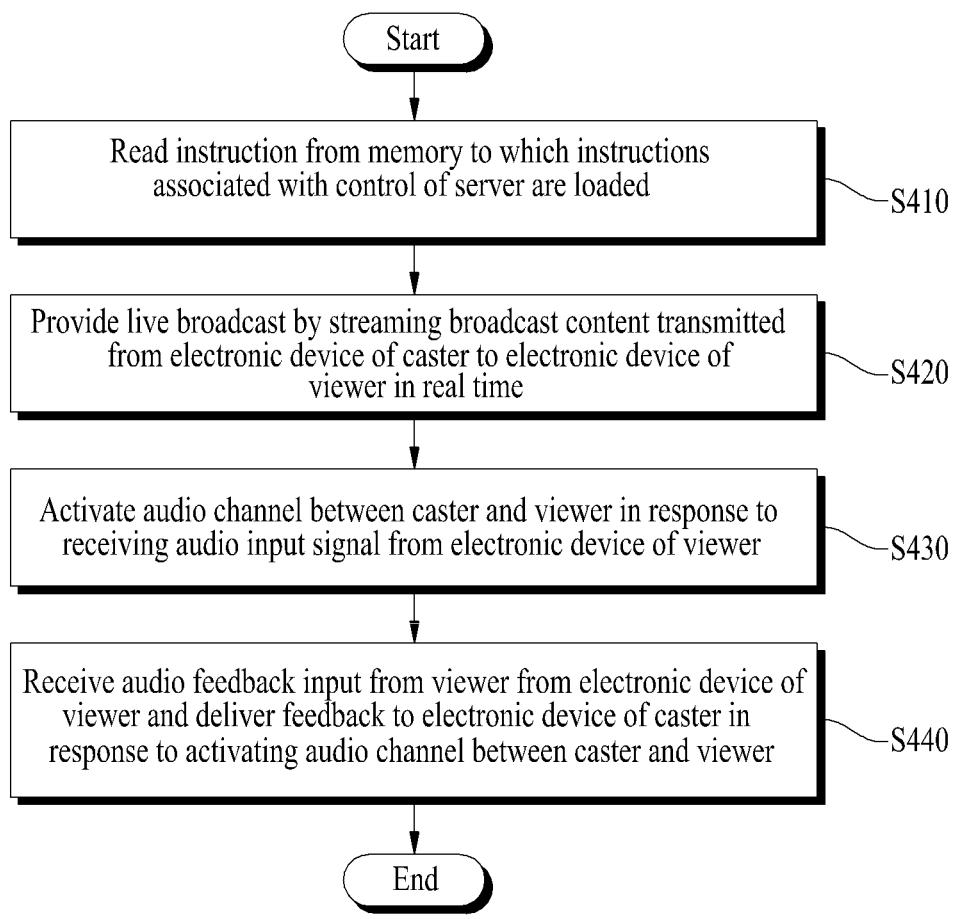
FIG. 4 is a flowchart illustrating an example of a method performed by a server according to at least one example embodiment.

FIG. 3 is a block diagram illustrating an example of a component includable in a processor of a server according to at least one example embodiment, and FIG. 4 is a flowchart illustrating an example of a method performed by a server according to at least one example embodiment.

Herein, the server 150 serves as a platform that provides a live broadcast streaming service to the plurality of electronic devices 110, 120, 130, and/or 140 that are clients. The server 150 may provide the live broadcast streaming service in conjunction with an application installed on the electronic devices 110, 120, 130, and/or 140, and a viewer may immediately deliver an audio feedback to a caster during the live broadcast.

Referring to FIG. 3, to implement the live broadcast providing method of FIG. 4, the server 150 may include a live broadcast provider 310 and a feedback deliverer 320 as components of the processor 222 of the server 150. Depending on various example embodiments, the components of the processor 222 may be selectively included in or excluded from the processor 222. Also, depending on various example embodiments, the components of the processor 222 may be separate or merged for representation of a function of the processor 222.

The processor 222 and the components of the processor 222 may control the server 150 to implement operations S410 through S440 included in the live broadcast providing method of FIG. 4. For example, the processor 222 and the components of the processor 222 may be configured to execute instructions according to a code of at least one program and a code of an OS included in the memory 221.

Here, the components of the processor 222 may be representations of different functions of the processor 222 performed by the processor 222 in response to an instruction provided from a program code stored in the server 150. For example, the live broadcast provider 310 may be used as a functional representation of the processor 222 that controls the server 150 to provide a live broadcast in response to the instruction.

Referring to FIG. 4, in operation S410, the processor 222 may read an instruction from the memory 221, to which instructions associated with control of the server 150 are loaded. In this case, the read instruction may include an instruction for controlling the processor 222 to perform operations S420 through S440.

In operation S420, the live broadcast provider 310 may provide a live broadcast by receiving broadcast content transmitted from an electronic device of a caster and by streaming the received broadcast content to each of electronic devices of a plurality of viewers through a communication session between an account of the caster and accounts of the viewers. The live broadcast provider 310 may provide a live broadcast streaming service based on a social network service (SNS), for example, a messenger. The live broadcast streaming service may deliver broadcast contents including videos and audios of the caster to viewers in real time through one-way communication. For example, the live broadcast provider 310 may provide the live broadcast streaming service through a chatroom of a social network, that is, a chatroom corresponding to a communication session established between the account of the caster and an account of a viewer. Here, the live broadcast provider 310 may provide a live broadcast of the caster to a viewer selected by the caster. For example, the live broadcast provider 310 may allow a target selected from a list of chatrooms of the social network or a list of friends stored on the electronic device of the caster to participate in a chatroom for the live broadcast of the caster and may provide the corresponding broadcast content to the selected target.

In operation S430, the feedback deliverer 320 may activate an audio channel between the caster and a viewer in response to receiving an audio input signal from an electronic device of a single viewer among viewers viewing the live broadcast of the caster. Here, activating the audio channel is to convert a one-way communication service channel to a two-way communication service channel in order to deliver an audio feedback of the viewer to the caster during the live broadcast of the caster. An audio channel of a push-to-talk (PTT) scheme or a voice call scheme, such as walkie-talkie, may be supported for such audio feedback. For example, when the viewer selects an interface for an audio input in a chatroom while the live broadcast of the caster is ongoing, the feedback deliverer 320 may open a voice call channel between the caster and the viewer in response to a corresponding selected signal.

In operation S440, the feedback deliverer 320 may receive the audio feedback input from the viewer during the live broadcast, and may deliver the audio feedback from the electronic device of the viewer to the electronic device of the caster. As the audio channel between the caster and the viewer is activated, the feedback deliverer 320 may receive an audio message of the viewer in real time and may immediately deliver the audio message to the caster. Accordingly, the caster may immediately listen to the audio message of the viewer without a need to separately manipulate the chatroom in which the live broadcast is ongoing, or without performing a verification procedure, for example. A type of the audio feedback may be configured using a real-time transmission scheme such as a push-to-talk (PTT) scheme, a walkie-talkie scheme or a voice call. However, these are provided as non-limiting examples only. According to some other example embodiments, the audio feedback may be provided in a recording file form. That is, the feedback deliverer 320 may receive an audio message in a recording file form from the electronic device of the viewer, may deliver the received audio message to the electronic device of the caster, and may verify the audio message sent from the viewer by automatically playing the recording file received through the chatroom in which the live broadcast is ongoing or by playing the recording file in response to a request from the caster. The audio feedback of the viewer may be provided directly to the caster during the live broadcast. As another example, the audio feedback may be provided to be shared by all of the users participating in the chatroom in which the live broadcast of the caster is ongoing.

FIGS. 5 through 8 illustrate examples of a chatroom screen displayed on an electronic device of a viewer viewing a live broadcast according to at least one example embodiment.

Figure 5:
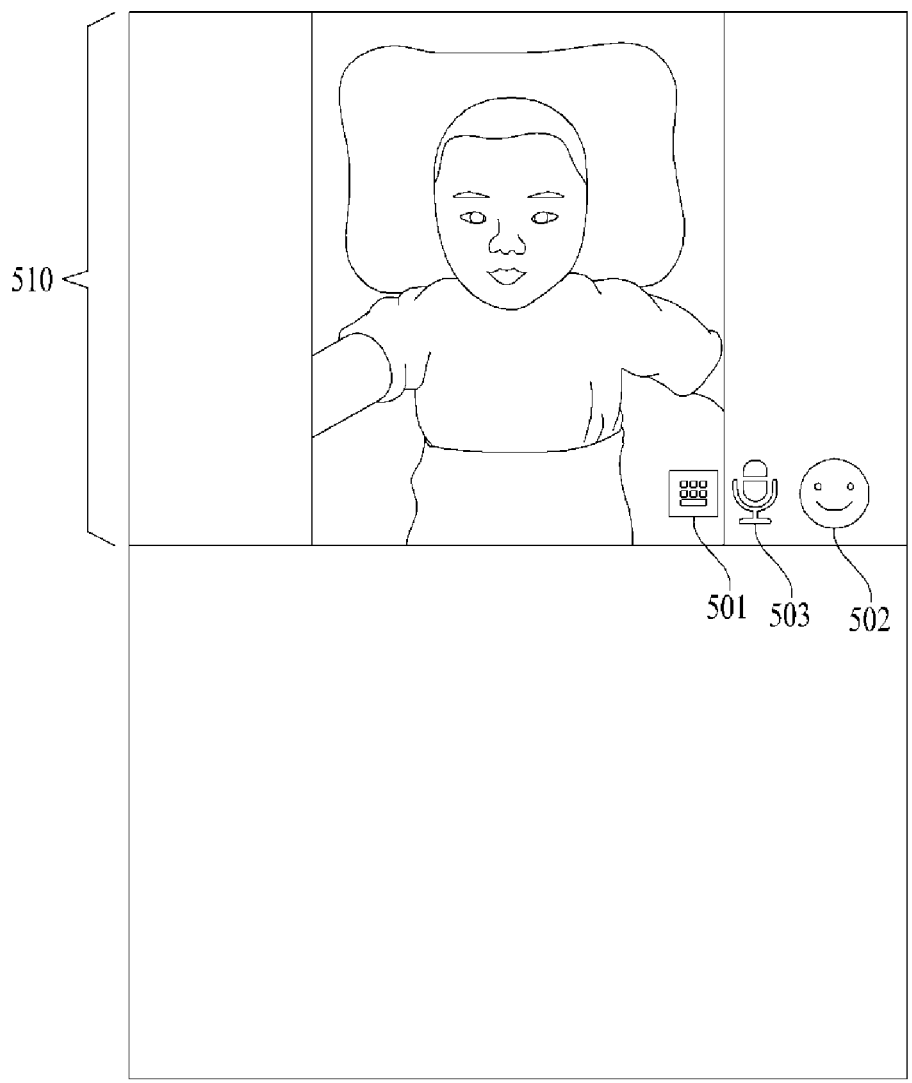
FIGS. 5 through 8 illustrate examples of a chatroom screen displayed on an electronic device of a viewer viewing a live broadcast according to at least one example embodiment.

FIG. 5 illustrates an example of a chatroom screen 500 displayed on the electronic device of the viewer. A dedicated application installed on the electronic device may display a screenshot 510 of a live broadcast of the caster through the chatroom screen 500 in which viewers and the caster participate. For example, the screenshot 510 of the live broadcast may have a predetermined (or, alternatively, desired) screen ratio and may be displayed in a fixed form, that is, in an embedded form at an upper end of the chatroom screen 500.

However, the screenshot 510 is provided as a non-limiting example only. In addition to the example of FIG. 5, the screenshot 510 of the live broadcast may be displayed in various forms, such as a full screen mode or a picture-in-picture (PIP) mode, according to some other example embodiments.

Accordingly, the viewer may view the live broadcast of the caster in real time through the screenshot 510 of the live broadcast displayed on the chatroom screen 500 of the dedicated application installed on the electronic device.

The chatroom screen 500 may include a feedback input menu that enables the viewer to input a feedback on a corresponding broadcast while viewing the live broadcast. Here, the feedback input menu may include a text input menu 501 for inputting a text-based message, an image input menu 502 for inputting a feedback based on a variety of images, such as a sticker and emogi, and, particularly, an audio input menu 503 for inputting an audio message as a viewer feedback on the live broadcast.

Figure 6:
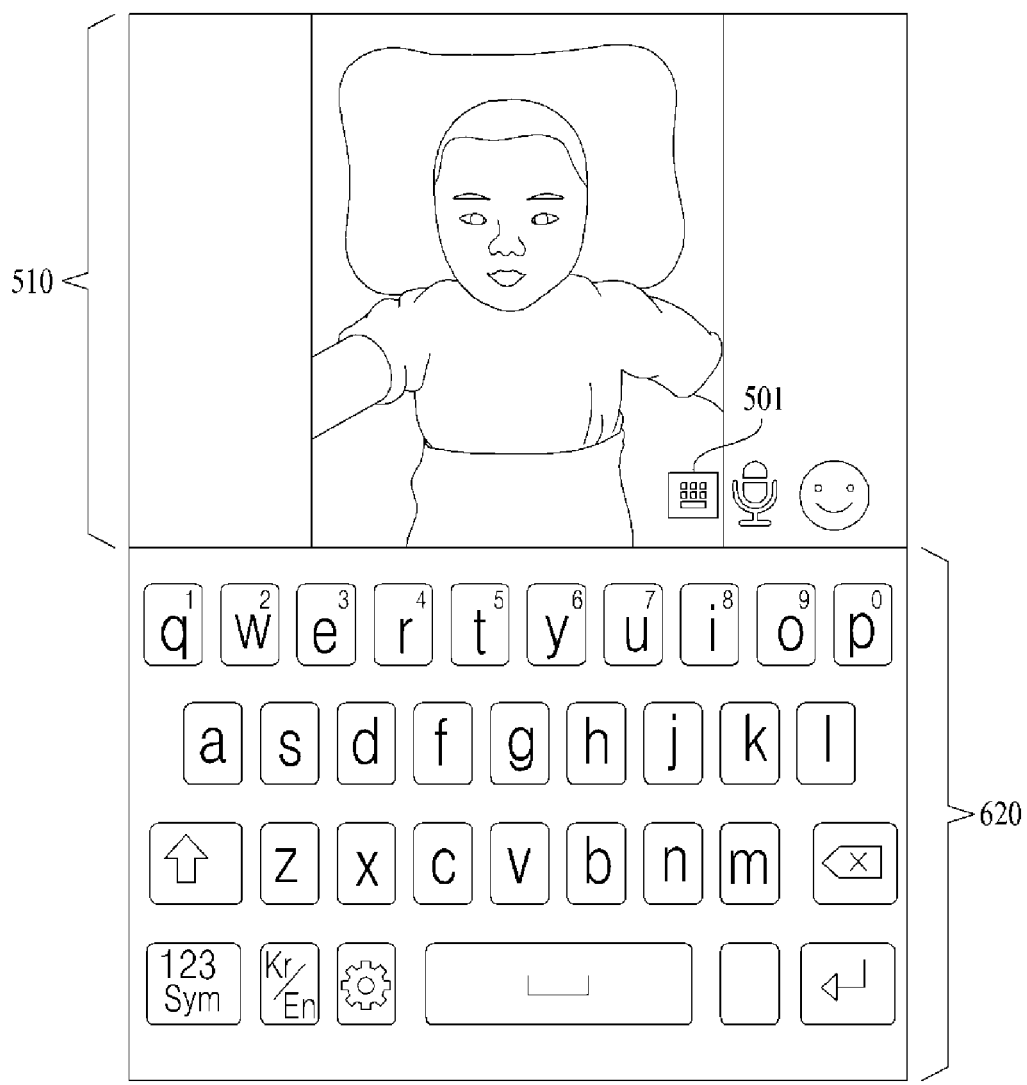

Referring to FIG. 6, in response to the viewer selecting the text input menu 501 on the chatroom screen 500 while viewing the live broadcast, the dedicated application installed on the electronic device may execute a virtual keyboard 620 for inputting a text on the chatroom screen 500, and may transmit a text message input by the viewer through the virtual keyboard 620 to the caster through the server 150.

Figure 7:
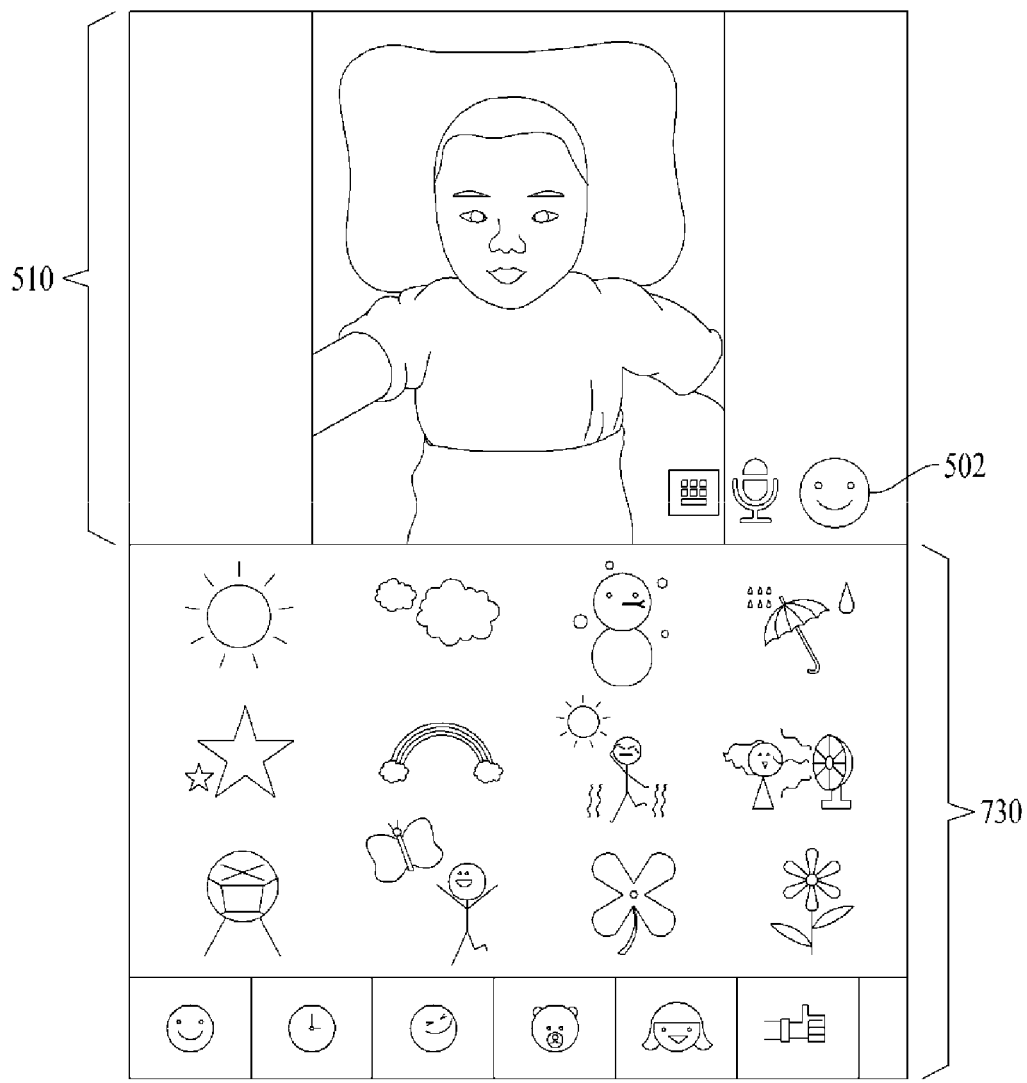

Referring to FIG. 7, in response to the viewer selecting the image input menu 502 on the chatroom screen 500 while viewing the live broadcast, the dedicated application installed on the electronic device may display a list of images 730, such as a sticker or emogi, on the chatroom screen 500 and may transmit an image selected by the viewer from the list of images 730 to the caster through the server 150.

Figure 8:
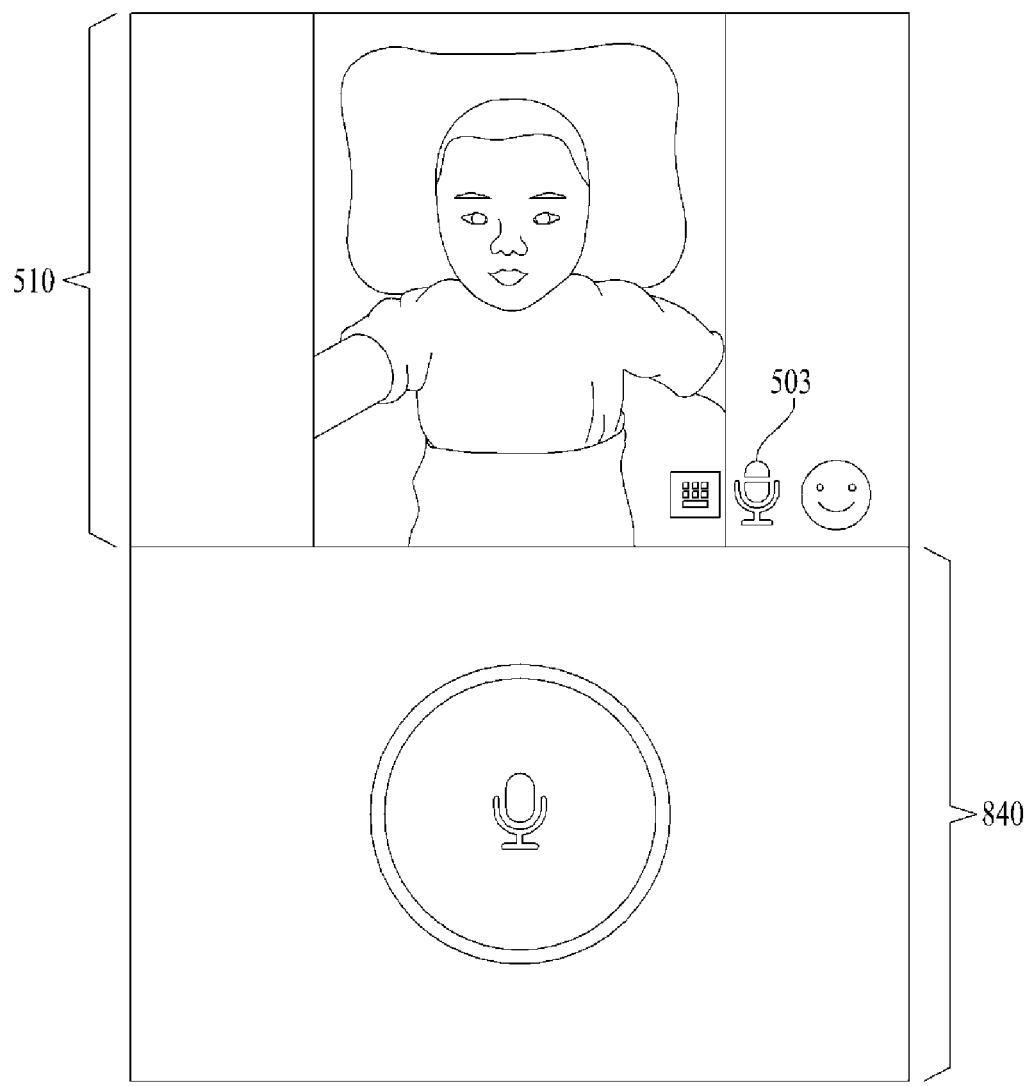

Referring to FIG. 8, in response to the viewer selecting the audio input menu 503 on the chatroom screen 500 while viewing the live broadcast, the dedicated application installed on the electronic device may display an active state 840 of an audio input interface on the chatroom screen 500 and may transmit an audio message input by the viewer in the active state 840 of the audio input interface to the caster through the server 150. Here, in response to the viewer selecting the audio input menu 503 on the chatroom screen 500, the feedback deliverer 320 may receive the corresponding selection signal as an audio input signal of the viewer, may activate an audio channel between the caster and the viewer based on the audio input signal, may receive the audio message of the viewer in real time, and may immediately deliver the audio message to the caster.

In a conventional live broadcast environment, it may not be possible for the viewer to directly deliver an audio-based feedback to the caster and thus, may need to depend on a text-based feedback only. In contrast to the conventional live broadcast environment, some example embodiments may provide a live broadcast streaming service including a function that enables the viewer to directly deliver an audio message to the caster during a live broadcast in order to provide a feedback environment optimal for the live broadcast to a user having difficulty or discomfort in inputting a text, or a user familiar with audio communication, etc.

Accordingly, the live broadcast streaming service may provide a function that enables the viewer to deliver an audio message to the caster in real time, in addition to enabling the viewer to deliver a text message and an image (sticker, emoji, etc.), as a viewer feedback on the live broadcast of the caster. For example, the viewer may choose to deliver an audio message if the viewer feels that it is cumbersome or difficult to input a text message or an image (e.g., considering the particular viewer's current situation, surrounding environment, physical capabilities, etc.).

Whether to display any one or more of the text input menu 501, the image input menu 502, and the audio input menu 503 on the chatroom screen 500, which is described above with reference to FIGS. 5 through 8, may be determined based on settings of the caster that presents the live broadcast. For example, when the caster allows only an audio feedback among viewer feedback types in broadcast environment settings, the text input menu 501 and the image input menu 502 may not be displayed and only the audio input menu 503 may be selectively displayed on the chatroom screen 500 on which the viewer views the live broadcast. As another example, whether to display at least one of the text input menu 501, the image input menu 502, and the audio input menu 503 may be automatically determined based on personal information (e.g., age) of the viewer, a viewing environment (e.g., based on one or more of mobility, location, and/or time), and/or feedback history. For example, in a situation when the viewer is moving or when a ratio of audio feedback is usually largest, the audio input menu 503 may be selectively displayed on the chatroom screen 500 on which the viewer views the live broadcast.

In some example embodiments, the viewer feedback, such as a text message, an image, and an audio message, on the live broadcast may be delivered only to the caster that presents the corresponding broadcast. In some other example embodiments, the viewer feedback may be delivered to all of the users, including the caster and all viewers, which participate in a chatroom in which the live broadcast is ongoing.

The server 150, that is, the processor 222 may also store live broadcast contents and chatroom information including caster information and viewer information in a database system (not shown) included in or interactable with the server 150, and may store a feedback, for example, a text message, an image, and/or an audio message, received from the viewer with respect to each piece of broadcast content. The viewer feedback may also be stored in a local storage area of a client of at least one of the caster and the viewer. Although the live broadcast starts, the server 150 may provide a function of reading and verifying again the viewer feedback from the server 150 or the local storage area of the client.

According to at least one example embodiment, the viewer may directly deliver an audio feedback to the caster during the live broadcast. Here, a recording file form as well as a real-time transmission scheme such as a push-to-talk (PTT) scheme, a walkie-talkie scheme or a voice call may be supported for providing the audio feedback.

Figure 9:
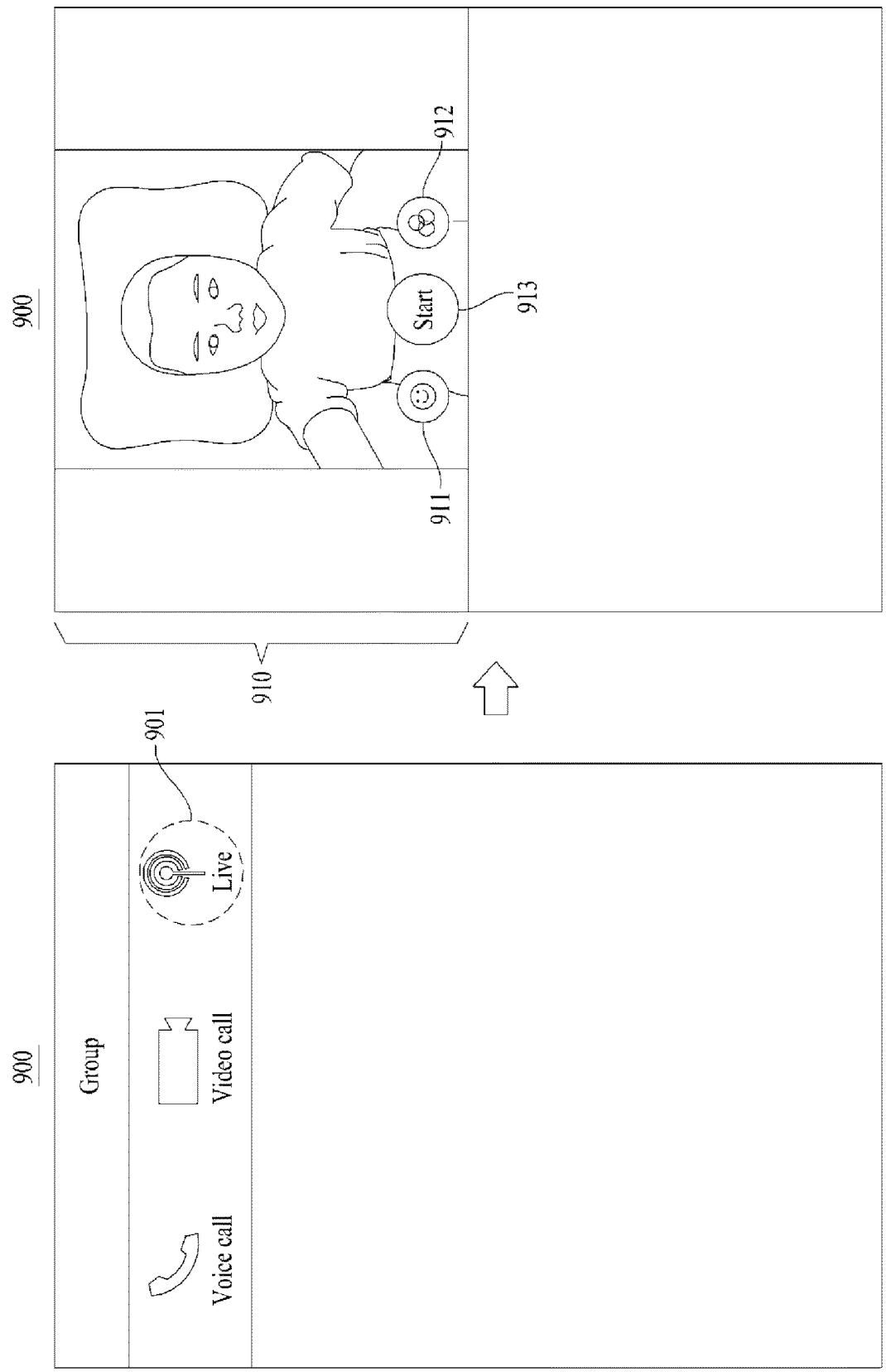
FIGS. 9 and 10 illustrate examples of a chatroom screen displayed on an electronic device of a caster presenting a live broadcast according to at least one example embodiment.
Figure 10:
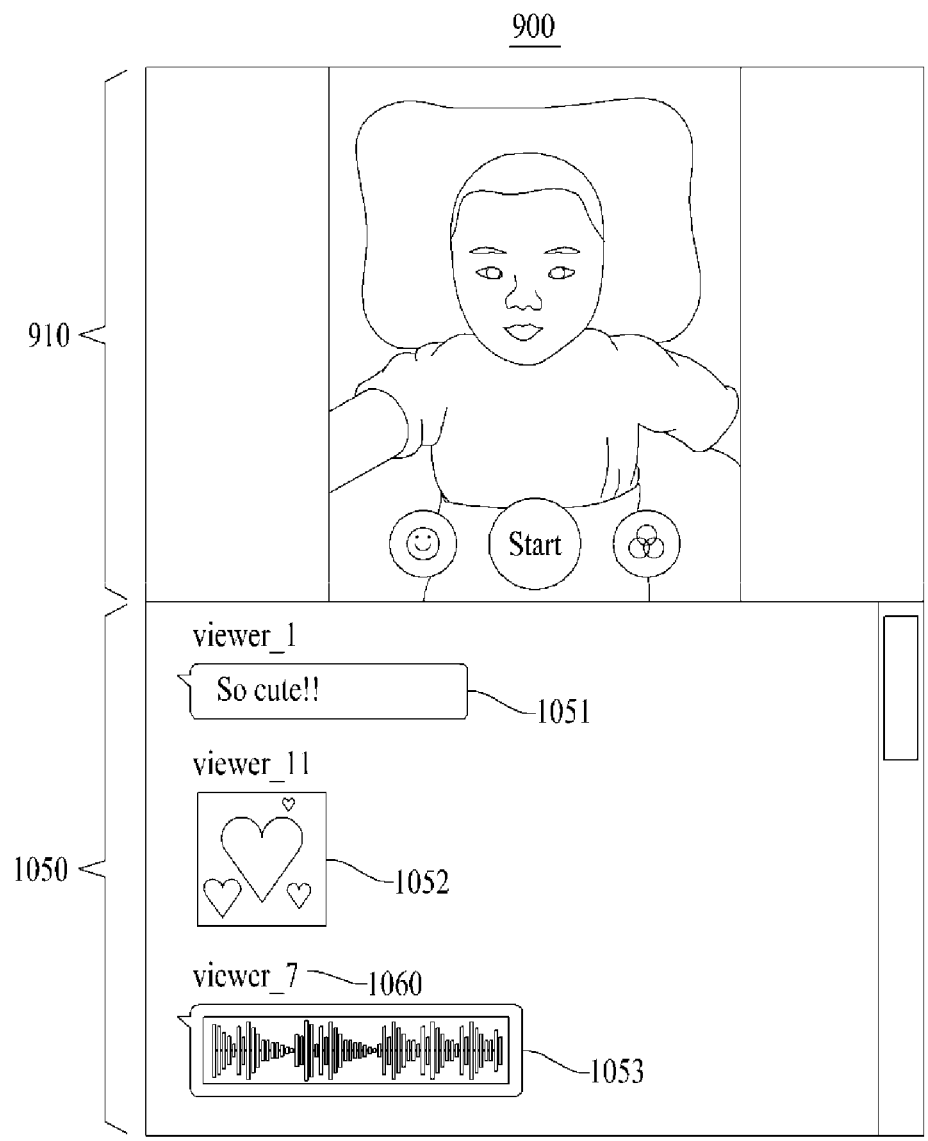

FIGS. 9 and 10 illustrate examples of a chatroom screen displayed on an electronic device of a caster presenting a live broadcast according to at least one example embodiment.

FIG. 9 illustrates an example of a chatroom screen 900 displayed on the electronic device of the caster. A dedicated application installed on the electronic device provides a function that enables the caster to present a live broadcast on the chatroom screen 900. For example, the chatroom screen 900 of a group configured by the caster may include a 'Live' menu 901 for providing a live broadcast to all of users participating in the corresponding chatroom.

In response to the caster selecting the 'Live' menu 901 on the chatroom screen 900 of the group configured by the caster for the live broadcast, a screenshot 910 of a broadcast including a video acquired from a camera of the electronic device of the caster may be displayed on the chatroom screen 900.

The screenshot 910 of the broadcast may have a predetermined (or, alternatively, desired) screen ratio and may be displayed in a fixed form, that is, in an embedded form at an upper end of the chatroom screen 900, for example. However, the screenshot 910 is provided as a non-limiting example only. In addition to the example of FIG. 9, the screenshot 910 of the live broadcast may be displayed in various forms, such as a full screen mode or a PIP mode, according to some other example embodiments.

The chatroom screen 900 may include a 'Start' menu 913 for starting a live broadcast with a captured camera video on the screenshot 910 of the broadcast. Further, the chatroom screen 900 may include an effect menu 911 for applying a variety of effects on the camera video displayed on the screenshot 910 of the broadcast, and a filter menu 912 for applying a variety of filters on the camera video displayed on the screenshot 910 of the broadcast.

In response to the caster selecting the 'Start' menu 913 on the chatroom screen 900, the live broadcast provider 310 may provide a live broadcast streaming service using the captured camera video on the screenshot 910 of the broadcast to a user participating in the corresponding chatroom. That is, the live broadcast provider 310 may stream broadcast content transmitted from the electronic device of the caster to each of electronic devices of viewers in real time through a chatroom in which a plurality of users are selected as viewers by the caster to view the live broadcast.

Here, the feedback deliverer 320 may receive the feedback, for example, a text message, an image, and/or an audio message, input by the viewer from the electronic device of the viewer during the live broadcast, and may deliver the feedback to the electronic device of the caster. Referring to FIG. 10, the chatroom screen 900 may include an interface area 1050 for displaying viewer feedback information about an ongoing live broadcast. The viewer feedback may include a text feedback 1051 that is input using a text message, and an image feedback 1052 input that is input using an image, such as a sticker or emogi. In particular, in some example embodiments, the viewer feedback may include an audio feedback that is input using audio as one of the feedback types.

The audio feedback may be provided using a real-time transmission scheme such as a push-to-talk (PTT) scheme, a walkie-talkie scheme or a voice call, or in a recording file format, as an audio message that the viewer directly delivers to the caster during the live broadcast. A dedicated application installed on the electronic device of the caster enables an audio message received from the viewer to be directly output through an audio output interface of the electronic device immediately after the audio message is received from the viewer, such that the caster may immediately listen to and verify the audio message of the viewer without performing a separate manipulation of the chatroom in which the live broadcast is ongoing, or without performing a verifying procedure, for example.

According to some example embodiments, in contrast to the text feedback 1051 or the image feedback 1052 that may be directly represented as visual information in the interface area 1050 of the chatroom screen 900, the audio feedback may be output through the audio output interface of the electronic device of the caster instead of using the chatroom screen 900. Here, identification information 1060 of a viewer that delivers the audio feedback and audio playback state information 1053 indicating that the audio message is being output may be displayed in the interface area 1050 of the chatroom screen 900.

In some example embodiments, the user feedback, for example, the text feedback 1051, the image feedback 1052, and/or the audio playback state information 1053, may be displayed only on the chatroom screen 900 associated with the caster presenting the live broadcast. In some other example embodiments, the user feedback may be provided to be shared by all of the users through the chatroom screen 900 of the caster and the chatroom screen 500 for viewers viewing the live broadcast.

Whether to share the viewer feedback, for example, the text feedback 1051, the image feedback 1052, and/or the audio feedback (represented by the audio playback state information 1053), with the viewers may be determined based on settings of the caster that presents the live broadcast. Here, whether to share the viewer feedback with the viewers may be determined for each feedback type, for example, each of the text feedback 1051, the image feedback 1052, and the audio feedback. For example, when the caster allows the text feedback 1051 and the image feedback 1052 to be shared with the viewers and disallows the audio feedback to be shared with the viewers using broadcast environment settings, the text feedback 1051 and the image feedback 1052 may be displayed on the chatroom screen 500 for all the viewers and the chatroom screen 900 of the caster, and the audio feedback (represented by the audio playback state information 1053) may be output only for the caster.

According to some example embodiments, a function of delivering a viewer feedback to a caster using an audio message in real time is provided, in addition to a function of delivering the viewer feedback to the caster using a text message or an image, during a live broadcast. Accordingly, a user having difficulty in creating a text message may easily deliver a feedback to the caster through the audio message. Likewise, a caster having difficulty in verifying a text message may easily and quickly verify the feedback during the live broadcast, since the audio feedback may be immediately output by the electronic device of the caster.

The systems and/or apparatuses described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments, or vice versa.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected example embodiment, even if not specifically shown or described. The same may also be varied in many ways. Such variations are not to be regarded as a departure from the disclosure, and all such modifications are intended to be included within the scope of the disclosure.

What is claimed is:

1. A method implemented on a computer system, wherein the computer system comprises one or more processors configured to execute non-transitory computer-readable instructions included in a memory to perform the method, and the method comprises:

providing, by the one or more processors, a live broadcast by receiving broadcast content transmitted from an electronic device of a caster, and by streaming the received broadcast content to each of electronic devices of a plurality of users through a communication session established between an account of the caster and accounts of the plurality of users;

managing allowable features of the communication session based on settings set in broadcast environment settings;

receiving, by the one or more processors, an audio feedback about the live broadcast from an electronic device of a user during the live broadcast; and delivering, by the one or more processors, the audio feedback to the electronic device of the caster, wherein the audio feedback is delivered to the caster and each of the electronic devices of the plurality of users or only to the caster, depending on the settings set by the caster, and wherein the managing the allowable features includes displaying at least one of a text input menu, an image input menu, and an audio input menu on each of the electronic devices automatically determined based on environmental conditions of each of the plurality of users and the settings, the environmental conditions of each of the plurality of users including age of each of the users, viewing environment of each of the users, and feedback history of each of the users.

2. The method of claim 1, wherein the delivering comprises
activating an audio channel between the account of the caster and the account of the user in response to receiving an audio input signal from the electronic device of the user;
receiving an audio message from the electronic device of the user in real time; and
delivering the audio message to the electronic device of the caster.

3. The method of claim 1, wherein the delivering comprises activating an audio channel of a push-to-talk (PTT) scheme or a voice call scheme in response to an audio input signal from the electronic device of the user.

4. The method of claim 1, wherein the delivering comprises
receiving an audio message in a recording file format from the electronic device of the user; and
delivering the audio message to the electronic device of the caster.

5. The method of claim 1, wherein the audio feedback is output through an audio output interface of the electronic device of the caster immediately after the audio feedback is received.

6. The method of claim 1, wherein the delivering comprises determining whether to allow the audio feedback of the user based on the broadcast environment settings of the caster.

7. The method of claim 1, wherein the delivering comprises determining whether to allow the audio feedback of the user based on a feedback history of the user.

8. The method of claim 1, wherein the delivering comprises determining whether to share the audio feedback with the plurality of users based on the broadcast environment settings of the caster.

9. The method of claim 1, wherein the providing comprises providing a function of applying at least one of an effect and a filter to an image of the broadcast content.

10. The method of claim 1, further comprising:
storing, by the one or more processors, the broadcast content and the audio feedback in a database system in association with a chatroom corresponding to the communication session.

11. A non-transitory computer-readable recording medium storing instructions that, when executed by a processor, cause the processor to perform the method of claim 1.

12. A computer system comprising:
a memory configured to store non-transitory computer-readable instructions; and
one or more processors configured to execute the non-transitory computer-readable instructions to
provide a live broadcast by receiving broadcast content transmitted from an electronic device of a caster, and by streaming the received broadcast content to each of electronic devices of a plurality of users through a communication session established between an account of the caster and accounts of the plurality of users;
manage allowable features of the communication session based on settings set in broadcast environment settings;
receive an audio feedback about the live broadcast from an electronic device of a user during the live broadcast; and
deliver the audio feedback to the electronic device of the caster, wherein the audio feedback is delivered to the caster and each of the electronic devices of the plurality of users or only to the caster, depending on the settings set by the caster, and
wherein the managing the allowable features includes displaying at least one of a text input menu, an image input menu, and an audio input menu on each of the electronic devices automatically determined based on environmental conditions of each of the plurality of users and the settings, the environmental conditions of each of the plurality of users including age of each of the users, viewing environment of each of the users, and feedback history of each of the users.

13. The computer system of claim 12, wherein the one or more processors are configured to execute the non-transitory computer-readable instructions to
activate an audio channel between the account of the caster and the account of the user in response to receiving an audio input signal from the electronic device of the user;
receive an audio message from the electronic device of the user in real time; and
deliver the audio message to the electronic device of the caster.

14. The computer system of claim 12, wherein the one or more processors are configured to execute the non-transitory computer-readable instructions to activate an audio channel of a push-to-talk (PTT) scheme or a voice call scheme in response to an audio input signal from the electronic device of the user.

15. The computer system of claim 12, wherein the one or more processors are configured to execute the non-transitory computer-readable instructions to
receive an audio message in a recording file format from the electronic device of the user; and
deliver the audio message to the electronic device of the caster.

16. The computer system of claim 12, wherein the audio feedback is output through an audio output interface of the electronic device of the caster immediately after the audio feedback is received.

17. The computer system of claim 12, wherein the one or more processors are configured to execute the non-transitory computer-readable instructions to determine whether to allow the audio feedback of the user based on the broadcast environment settings of the caster.

18. The computer system of claim 12, wherein the one or more processors are configured to execute the non-transitory computer-readable instructions to determine whether to share the audio feedback with the plurality of users based on the broadcast environment settings of the caster.

* * * * *